LE ROY W. FAIRCHILD.

COMBINED WATCH CHAIN BAR AND PENCIL.

No. 10,147. Reissued July 4, 1882.

Witnesses.

Walter S. Dodge.

Jas. F. DuBramel.

Inventor.

L. W. Fairchild, by W. C. Dodge

Atty.

N. PETERS, Photo-Lithographer, Washington, D. C.

UNITED STATES PATENT OFFICE.

LE ROY W. FAIRCHILD, OF NEW YORK, N. Y.

COMBINED WATCH-CHAIN BAR AND PENCIL.

SPECIFICATION forming part of Reissued Letters Patent No. 10,147, dated July 4, 1882.

Original No. 219,081, dated September 2, 1879. Application for reissue filed May 18, 1882.

*To all whom it may concern:*

Be it known that I, LE ROY W. FAIRCHILD, of New York, in the county of New York and State of New York, have invented certain new and useful Improvements in Combined Chain-Bar and Pencil; and I do hereby declare the following is a full, clear, and exact description of the invention, that will enable others skilled in the art to which it appertains to make and use the same, reference being had to the accompanying drawings, and to the letters of reference marked thereon, which form a part of this specification.

My invention consists in a novel construction and combination of an extension pencil or case and a case or sheath for containing and carrying the same, whereby the pencil is automatically extended by the act of withdrawing it from its inclosing tube, case, or sheath, and is automatically closed by inserting or replacing it in its sheath, tube, or case, as hereinafter more fully explained.

Figure 1:
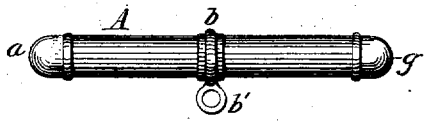
Figure 2:
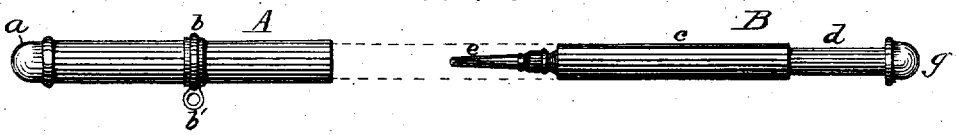

Figure 1 represents a chain-bar complete with my improved pencil-case inserted therein; Fig. 2, the bar with the pencil detached and extended to full length; and Fig. 3 represents the pencil closed, a portion being shown in section to more clearly illustrate its construction.

For conveniently illustrating my invention, I have shown it applied to what is known as a "chain-bar," such as is used for securing watch-chains to a vest, and in which it is not uncommon to insert a small pencil having a metal case; but in all prior inventions of the kind, so far as I am aware, the pencil was either secured or permanently attached to the bar, or, if made detachable, required to be extended by manipulation in order to lengthen it and cause the point to protrude before it could be used. Again, these small pencils as heretofore made had no receptacle for a supply of extra leads, and hence were of but little practical use.

In order to carry out my invention, a hollow bar or tube of the requisite diameter and length is provided, and may have one end permanently capped or closed, as shown at *a*, Figs. 1 and 2. To the middle of this bar or tube a loose ring, *b*, having an eye, *b'*, is attached, by which it is linked to the watch chain or guard. This completes the hollow bar proper, which constitutes the sheath or case for receiving and carrying the extension case or pencil B. The pencil-case B is formed of two hollow cylinders or tubes of different diameters, the outer tube or section being about two-thirds the length of the inner tube or section, *d*, over which it freely slides to a distance of about one-half its own length, or one-third of the length of the inner tube, *d*, this being about the length of the point *e*, which contains the lead.

Figure 3:
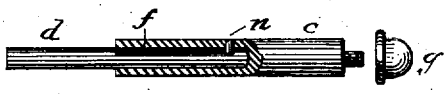

A slot, *f*, is cut in the tube *d*, as shown in Fig. 3, and through this slot a pin or screw, *n*, extends, connecting the outer tube, *c*, with the internal portion to which the point *e* is attached, so that whenever the outer tube, *c*, is moved the pencil-point *e* is caused to move with it, the pin *n* at the same time serving as a stop to limit the movement of the outer tube, *c*, and pencil-point *e*, which can only move the length of the slot, and which is but about one-third of the length of the tube *d*. The outer or short section, *c*, is made to fit closely within the hollow bar A when shoved into it, and where it will be firmly but not too resistingly held, so that when the pencil B is shoved into the hollow bar or tube it is telescoped or contracted to its minimum length. This is effected by having the friction between the tube *c* and the interior of the case A greater than the friction between the parts *c*, *d*, and *e*, whereby when the pencil is inserted in its case A those parts which have the least friction move upon each other first—that is to say, the part *c*, with its attached point *e*, first slides back the length of the slot *f*, after which, by continuing to press on the head *g* of the pencil B, it is forced into the case A to the position represented in Fig. 1. It follows necessarily that when force is applied to the pencil-head *g* to pull the pencil out of the case A the first result will be to draw the tube *d* back within the tube *c*, thereby causing the point *e* to protrude, as represented in Fig. 2, after which, by continuing to pull on the head *g*, the pencil B will be withdrawn entirely from the bar or case A and be left extended, as shown in Fig. 2, ready for immediate use. In practice the contraction of the case B and its insertion into the case A follow so closely upon each other as to appear as one and the same operation, and the same is true of the extension and withdrawal of the pencil from its case A. It will thus be seen that, instead of having to screw the point *e* out after the pencil is withdrawn, in order to use it, it is automatically slid out in the act of withdrawing the pencil from its case or bar A, and vice versa.

Any other construction of pencil may be used, provided the construction be such that the movement of the outer section or tube, *c*, will slide upon the portion *d* and at the same time operate the point *e*.

The magazine or box for holding the reserve leads is formed in the upper or outer end of the tube *d*, and is provided with a cap or head, *g*, which can be removed, as shown in Fig. 3, and is preferably made of a form to correspond with the cap *a* at the closed end of the bar A, and should also be so formed as to afford a convenient means of taking hold of it to withdraw the pencil. A convenient and effective construction would be a cap of the circumference of the hollow bar A, with a chased or milled rim of a slightly larger diameter, as represented in the drawings. It is obvious, however, that the style and ornamentation may be varied according to the dictates of taste. So, too, it is obvious that so far as the automatic contraction and extension of the telescopic case B are concerned, and which constitute the gist of my invention, it is immaterial whether the pencil-point *e* or any similar small implement be used, and it is likewise immaterial what the form of the case A may be, so long as the cavity within it be made of the proper size to receive the case B and produce the necessary friction to cause the parts to operate as described.

I am aware that tubular chain-bars carrying a metallic pencil-case have before been made and used, and therefore I do not claim such a device, broadly, as my invention; but I am not aware that any device has before been made in which the inserted case was caused to operate automatically so as to close or contract the pencil-case by shoving it into its holding case or bar and extend the pencil by withdrawing it from its holding case or bar; and therefore

What I claim is—

1. In combination with a hollow holding case or bar, a detachable extension-case constructed in telescopic sections, and adapted to be extended by the operation of withdrawing the extension-case from its holding-case and retracted by returning it thereto, without further manipulation, substantially as described.

2. A detachable extension-case, B, having its exterior sliding section arranged to operate the point *e*, in combination with a hollow holding case or bar, A, the said parts being arranged to operate substantially as described, whereby the inner case, B, is extended by withdrawing it from the outer case and is contracted by shoving it into said outer case.

In testimony whereof I affix my signature in presence of two witnesses.

LE ROY W. FAIRCHILD.

Witnesses:
FRANCIS P. BURKE,
VICTOR W. BRUNDAGE.